United States Patent [19]

Kawai

[11] Patent Number: 4,556,255
[45] Date of Patent: Dec. 3, 1985

[54] ANCHOR MOUNTING DEVICE

[75] Inventor: Osamu Kawai, Fujisawa, Japan

[73] Assignee: NSK-Warner K.K., Japan

[21] Appl. No.: 511,093

[22] Filed: Jul. 6, 1983

[30] Foreign Application Priority Data

Jul. 9, 1982 [JP] Japan .............................. 57-104217[U]

[51] Int. Cl.$^4$ ............................................. A62B 35/00
[52] U.S. Cl. ..................................... 297/483; 280/808;
297/468
[58] Field of Search ........................ 297/468, 473, 483;
280/801, 808

[56] References Cited

FOREIGN PATENT DOCUMENTS 2613654 10/1977 Fed. Rep. of Germany ...... 280/808
2084002  7/1982 United Kingdom ................ 297/468
2110071  6/1983 United Kingdom ................ 297/468

Primary Examiner—James T. McCall
Attorney, Agent, or Firm—McGlew and Tuttle

[57] ABSTRACT

Disclosed herein is an anchor mounting device suitable for use in fixing an upper anchor, i.e., the deflector of a seat belt on the body of a vehicle while allowing the occupant to adjust the height of the deflector in accordance with his physical constitution. It comprises a base, a slide member guided along the base and carrying an anchor plate thereon, at least one latch piece mounted on the slide member and releasably kept in engagement with the base and means normally biasing the latch piece toward the engaged position. The slide member is provided with an interlocking portion which is capable of giving an additional support to the latch piece. It is easy to operate and, owing to the effective utilization of the base and slide member, can withstand heavy loads.

10 Claims, 21 Drawing Figures

ANCHOR MOUNTING DEVICE

BACKGROUND OF THE INVENTION

(1) Field of the Invention

This invention relates to an anchor mounting device suitable for use in vehicle seat belts, and more particularly to an adjustable anchor mounting device for 3-point support type vehicle seat belts.

(2) Description of the Prior Art

Coupled with the current trend toward faster vehicles, there is an ever-increasing need for wearing seat belts in order to protect occupants safely on emergencies such as collisions, sudden stops, etc. It is general to adopt a 3-point support type seat belt so as to simultaneously restrain the occupant's torso and lap area from the viewpoint of avoiding any secondary collision against interior structural parts of the vehicle.

Since the physical constitution of each occupant who wears a seat belt is different to a considerable extent, there was a danger that the occupant would not be effectively protected in case of emergency if the position of the anchorage for the shoulder webbing, which restrained the torso, was either too high or too low. This is true because the webbing extends over the face or neck area of the occupant in the former case and, in the latter case, does not come to the shoulder area but passes over the arm.

As countermeasures to the above problem, there have been proposed some anchor mounting devices which permit to attach their anchor plates at two or more locations so as to allow the occupants to select optimum locations for the attachment of the anchor plates depending on their physical constitutions. Reference may be made to U.K. Patent Specification No., 2,078,092A naming P. A. Rentrop Hubbert & Wagner and Fahrzeugausstattungen GmbH & Co. KG. as joint applicants and French Patent Specification No. 81 06624 naming Keiper Automobiltechnik GmbH & Co., KG as its applicant. However, there seems to be still some room for improvement to such anchor mounting devices because some of such anchor mounting devices require extremely irksome operations for positional adjustment of their anchor plates, other anchor mounting devices are unable to maintain their locations of attachment without failure or some other anchor mounting devices have complex structures.

SUMMARY OF THE INVENTION

With the foregoing in view, an object of this invention is to provide an anchor mounting device of a simple structure which device is easy to operate and can maintain its position without any failure even in the event of emergency.

In one aspect of this invention, there is thus provided an anchor mounting device which comprises:

a base mounted on a vehicle body and having interlocking means which is formed of a plurality of interlocking portions provided along the direction of displacement of an anchor plate;

a slide member guided along the base and carrying the anchor plate thereon;

at least one latch piece supported pivotally on the slide member and displaceable between a first position where the latch piece is in engagement with the interlocking means and a second position where the latch piece is out of engagement with the interlocking means;

means kept in engagement with the latch piece to normally bias the latch piece toward the first position; and an additional interlocking portion provided on the slide member and engageable with the latch piece only at a predetermined position, and when a load has been applied to the anchor plate, capable of transmitting the load from the slide member to the interlocking means by way of the latch piece.

The anchor mounting device according to this invention enjoys excellent effects that it is easy to operate and, owing to the effective utilization of the interlocking means of the base and the interlocking portion of the slide member, can withstand heavy loads.

The above and other objects, features and advantages of the present invention will become more apparent from the following description and the appended claims, taken in conjunction with the accompanying drawings.

DETAILED DESCRIPTION OF THE INVENTION AND PREFERRED EMBODIMENTS

Figure 1:
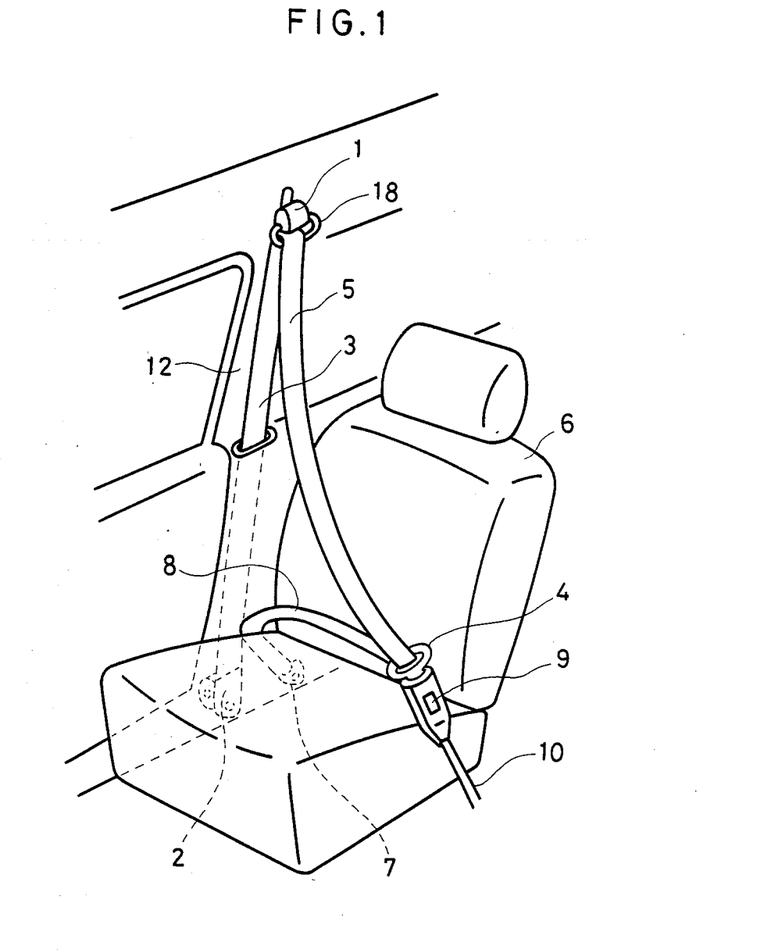
FIG. 1 is a schematic illustration of an automobile seat belt to which the present invention is applied.

FIG. 1 is a schematic illustration of an automobile seat belt to which the present invention is applied. An anchorage 1 is mounted on the automobile body. A lap-shoulder continuous webbing 3, which has been paid out from a retractor 2, extends through an anchor plate 18 provided with the anchorage 1 and forms a shoulder webbing 5. It extends further through a tongue 4 into a lap webbing 8 and is fixedly fastened to an anchor plate 7. The tongue 4 is fit in a buckle 9 attached to a flexible support 10 which is in turn secured to the floor of the automobile body.

Figure 2:
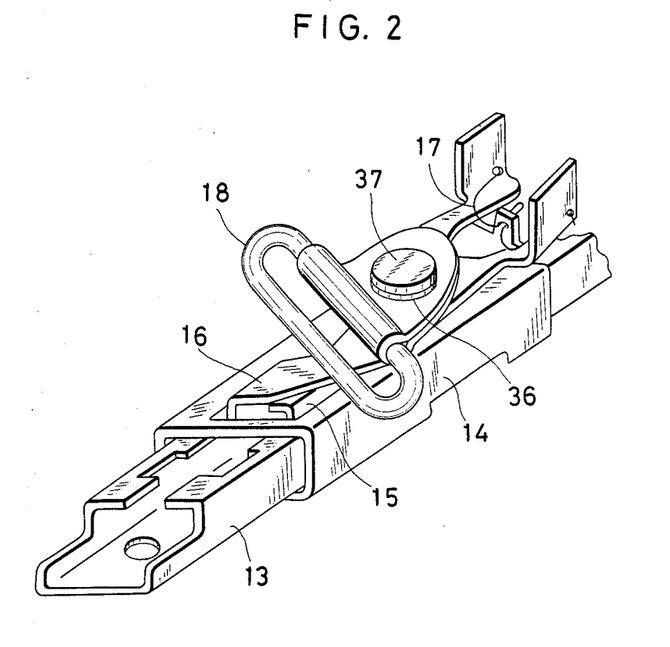
FIG. 2 is a perspective view of an anchor mounting device according to the first embodiment of this invention.
Figure 3:
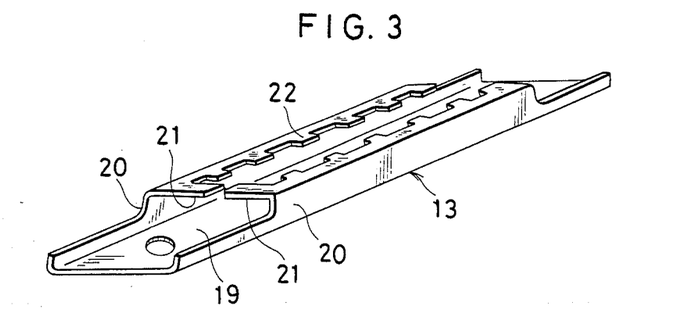
FIGS. 3 through 5 are perspective views of parts of the anchor mounting device according to the first embodiment.
Figure 4:
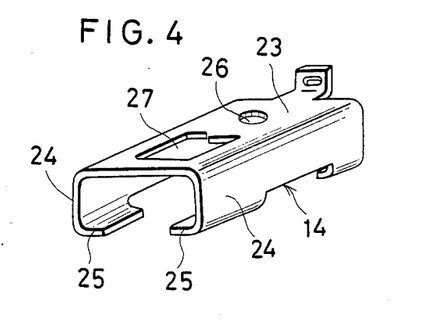

This invention intends to make the position of the anchor plate 18 adjustable. FIG. 2 is a perspective view of an anchor mounting device according to this invention, in which the device is shown in the assembled form. FIGS. 3 through 5 are perspective views of its constituent parts and FIG. 6 is a fragmentary front elevation of the anchor mounting device from which an anchor plate has been omitted. The anchor mounting device is constructed principally of a base 13 to be attached to a center pillar 12, a slide member 14 slidable up and down while being guided by the base 13, latch pieces 15,16 provided on the slide member 14 and adapted to fix the slide member 14 at a specified height, and a return spring 17 biasing the latch pieces 15,16.

The base 13 is, as shown in FIG. 3, equipped with a bottom plate 19, a pair of side plates 20,20 extending upright from the bottom plate 19 and bent portions 21,21 bent inwardly from the side plates 20,20. The bent portions 21,21 define a plurality of interlocking portions, i.e., teeth 22 which constitute interlocking means. The base 13 can be attached at the bottom plate 19 to the vehicle body.

A slide member 14 is provided in such a fashion that it surrounds the base 13. As illustrated in FIG. 4, the slide member 14 is formed of an upper plate 23, side plates 24,24 and bottom plates 25,25. Through the upper plate 23, there are bored an attachment hole 26 which is adapted to attach the latch pieces 15,16, which will be described later in this specification, and anchor plate 18 to the slide member 14. The upper plate 23 also defines an opening 27 which is an interlocking portion engageable with the latch pieces 15, 16. Incidentally, the latch pieces 15,16 and the opening 27 are shown as kept in engagement with each other in FIG. 6. It is however generally preferred to leave some clearances between the latch pieces 15,16 and the opening 27 for operational convenience. Even if such clearances are normally left, latch pieces 15,16 are bent and brought into engagement with the opening 27 when a load has been applied thereto as will be described later in this specification.

Figures 5A, 5B:
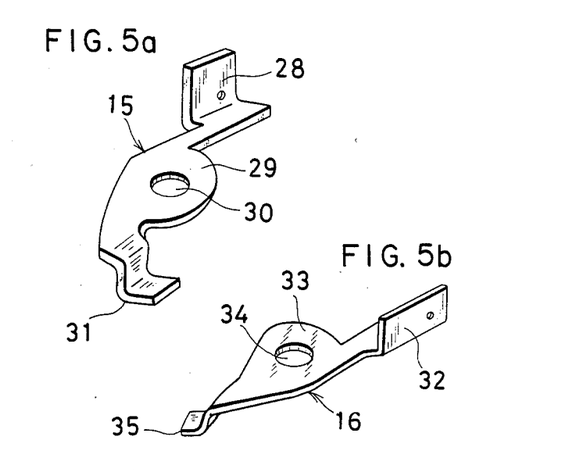
Figure 6:
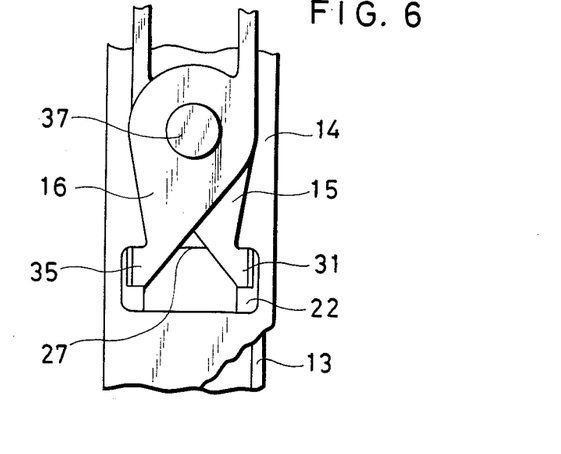
FIG. 6 is a fragmentary front elevation of the anchor mounting device according to the first embodiment.

The latch piece 15 is, as apparent from FIG. 5(a), formed of a finger rest 28, lever plate 29, pin hole 30 and interlocking leg 31. Its matching latch piece, i.e., the latch piece 16 is also formed of a finger rest 32, lever plate 33, pin hole 34 and interlocking leg 35. The latch pieces 15,16 are turnably secured via a nylon washer 36 to the upper plate 23 of the slide member 23, together with the anchor plate 18 and by means of a pin 37. The latch pieces 15,16 are arranged crosswise so that the interlocking legs 31,35 extend downwardly through the opening 27 formed through the upper plate 23 of the slide member 14 and the distal ends of the interlocking legs 31,35 both face outwardly (see, FIG. 2).

The return spring 17 is provided between the finger rests 28,32 of the latch pieces 15,16 and normally biases the latch pieces 15,16 in mutually-opposite and outward directions, in other words, in such directions that the interlocking legs 31,35 engage desired ones of the teeth 22 formed in the base 13.

Operation of the anchor mounting device according to the first embodiment of this invention will next be described. When an occupant is about to enter the vehicle, the anchor mounting device is in the state illustrated in FIG. 6. Namely, the interlocking legs 31,35 of the latch pieces 15,16 are in engagement with any ones of the teeth 22 formed in the base 13, thereby holding the anchor plate 18 at a constant height through the slide member 14 on which the latch pieces 15,16 are provided. In this state, the occupant sits in the seat and wears the seat belt as shown in FIG. 1. If the shoulder webbing 5 does not pass over his right shoulder, in other words, if the anchor plate 18 is not in a position suitable for the physical constitution of the occupant, it becomes necessary to adjust the position of the anchor plate 18.

The interlocking legs 31,35 are released from their engagement with the teeth 22 and the slide member 14 and anchor plate 18 are rendered slidable up and down on the base 13, if the finger rests 28,32 are pushed inwardly so as to shift the latch pieces 15,16 inwardly against the biasing force of the return spring 17. By removing the pushing forces to the finger rests 28,32 when the shoulder webbing 5 has been moved to a position where it passes over the right shoulder area of the occupant, the latch pieces 15,16 are again allowed to open outwardly against the biasing force of the return spring 17 and the interlocking legs 31,35 thus engage with the nearby teeth 22, thereby to hold the slide member 14, i.e., the anchor plate 18 at this position.

The above-mentioned operation of the latch pieces 15,16 does not require any pushing or pulling work and can thus be performed easily by the occupant who has already sat in the seat.

In the event of an emergency such as vehicle collision or the like, a load is applied to the anchor plate 18 via the webbing because of the inertia force of the occupant. This load is transmitted to the base 13 through two routes. Namely, one part of the load is transmitted to the latch pieces 15,16 via the pin 37 and is then born by the teeth 22 of the base 13, which teeth 22 are in engagement with the interlocking legs 31,35 respectively. The other part of the load is transmitted to the slide member 14 via the pin 37 and then to the interlocking legs 31,35 via the opening 27 of the slide member 14 and is finally born by the teeth 22 of the base 13, which are in engagement with the interlocking legs 31,35.

As described above, the load applied to the anchor plate 18 is received through the two routes in the above embodiment, thereby making the anchor mounting device possible to withstand heavy loads.

Figure 7:
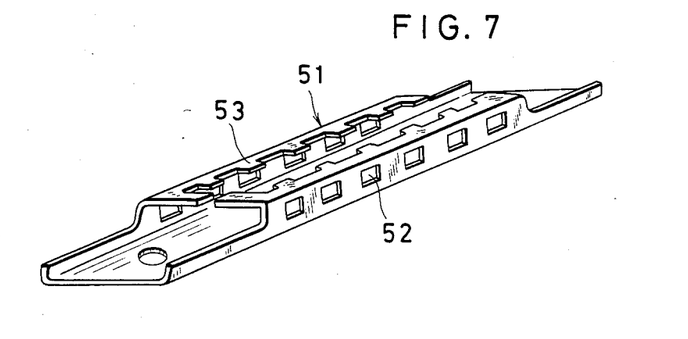
FIGS. 7 through 9 are perspective views of parts making up a modification of the first embodiment.
Figure 8:
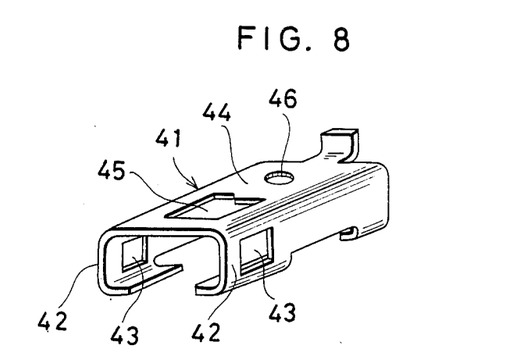
Figure 9:
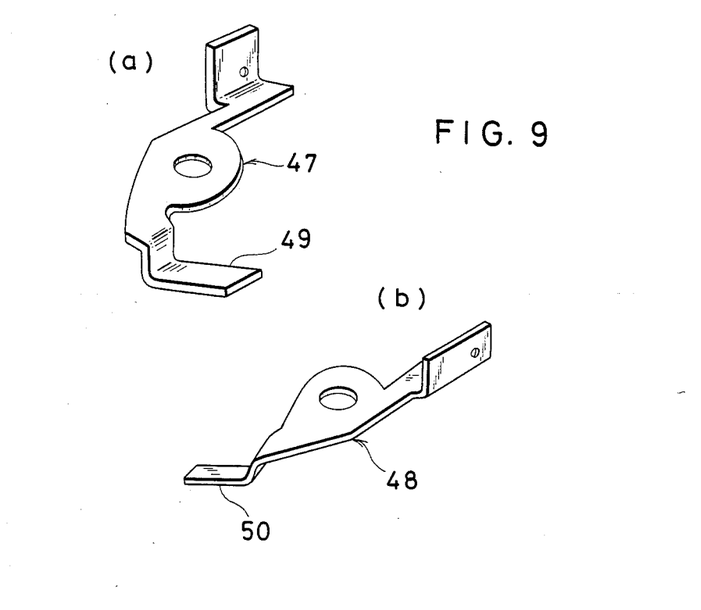
Figure 10:
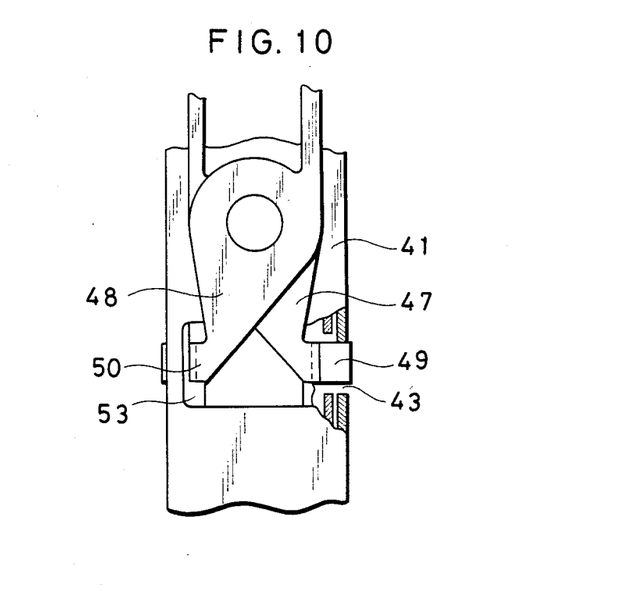
FIG. 10 is a fragmentary front elevation of the modification of the first embodiment.

Referring to FIGS. 7 through 9, a modification of the first embodiment will next be described. In the modified form, the interlocking portion of the slide member has been changed and, reflecting this change, the configurations of the latch pieces and base have also been subjected to modifications.

In the following description, all parts which are not different from their corresponding parts in the first embodiment will be omitted.

In this modified embodiment, windows 43,43 which serve as interlocking portions with latch pieces 47,48 are formed through side plates 42,42 of a slide member 41. Accordingly an opening 45 provided through an upper plate 44 of the slide member 41 is somewhat elongated toward an attachment hole 46 so that it will not interfer the latch pieces 47,48. On the other hand, the latch pieces 47,48 are elongated at their interlocking legs 49,50 in order to enable the interlocking legs 49,50 to engage with the windows 43,43 of the slide member 41 as depicted in FIGS. 9(a) and 9(b). A base 51 defines, besides teeth 53, guide openings 52 through its side plates. The guide openings 52 are of such dimensions as permitting free passage of the interlocking legs 49,50 therethrough. With respect to the transmission of the load exerted to the anchor plate, this modified embodiment is different from the first embodiment only in that one part of the load is transmitted to the interlocking legs 49,50 of the latch pieces 47, 48 via the windows 43,43 of the slide member 41. This modified embodiment can bring about the same effects as the first embodiment.

Figure 11:
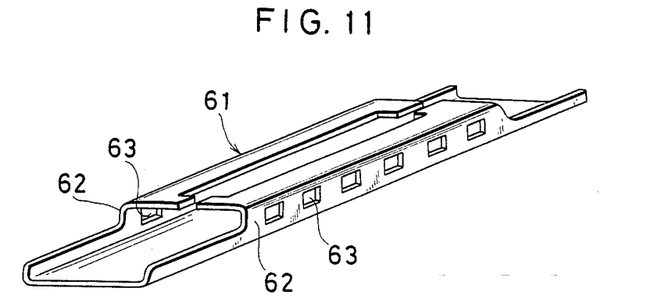
FIG. 11 is a perspective view of a base which is used to construct an anchor mounting device according to the second embodiment of this invention.
Figure 12:
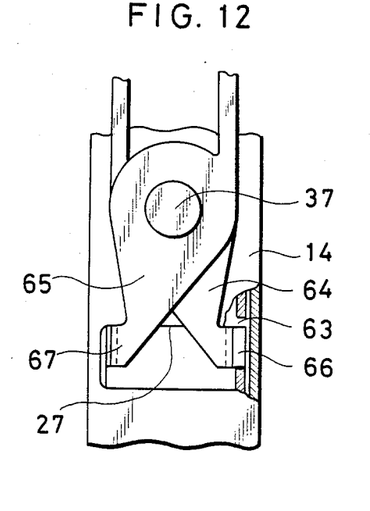
FIG. 12 is a fragmentary front elevation of the anchor mounting device according to the second embodiment.

Next, description will be made on the second embodiment of this invention in which the interlocking portions of the base have been modified. FIG. 11 is a perspective view of a base incorporating the modified interlocking portions. FIG. 12 is a fragmentary front elevation of the anchor mounting device according to the second embodiment of this invention, showing the device in the assembled form. In the second embodiment, a plurality of openings 63,63, . . . which serve as interlocking portions are formed through side plates 62,62 of a base 61. Latch pieces 64,65, which engage with the openings 63,63 are formed into such configurations that their interlocking legs 66,67 are somewhat elongated as shown in FIG. 12.

The anchor mounting device according to the second embodiment can be used in the same manner as that according to the first embodiment. The height of the anchor plate may be adjusted with ease by pushing the finger rests inwardly and sliding the slide member up or down because the inwardly applied finger forces release the interlocking legs 66,67 from their engagement with the openings 63,63. Here again, the load applied to the anchor plate is transmitted through two routes to the base. One part of the load is transmitted to the latch pieces 64,65 via the pin 37 and is born by the openings 63,63 which are in engagement with the interlocking legs 66,67. The other part of the load is transmitted first to the slide member 14 via the pin 37 and then to the interlocking legs 66,67 of the latch pieces 64,65 via the opening 27 of the slide member 14, and finally born by the openings 63,63 which are in engagement with the interlocking legs 66,67.

It is apparent that the same effects as the first embodiment can be achieved also in the second embodiment.

Figure 13:
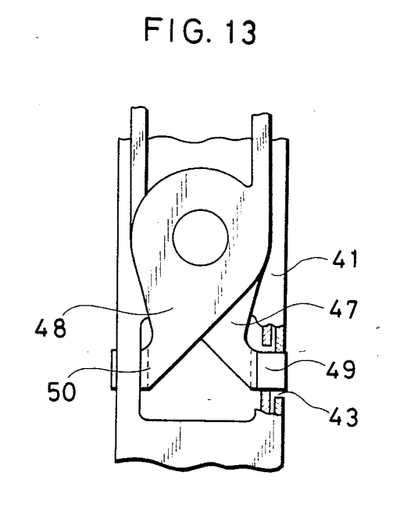
FIG. 13 is a fragmentary front elevation of a modification of the anchor mounting device according to the second embodiment.

Similar to the first embodiment, modifications may be contemplated to the second embodiment. The slide member 14 and latch pieces 64,65 may be modified as shown respectively in FIGS. 8 and 9. This modified embodiment can bring about the same effects as the second embodiment, although it is different from the second embodiment only in that one part of the load applied to the anchor plate is transmitted to the latch pieces 47,48 via the windows 43,43.

Figure 14:
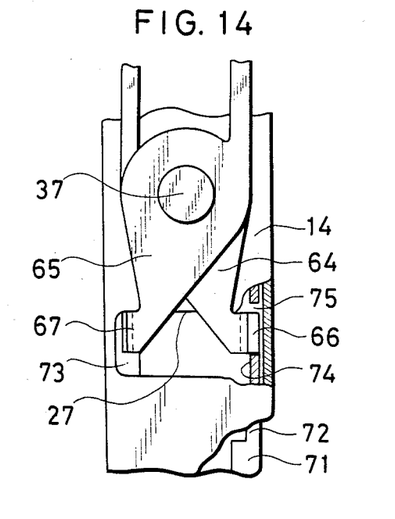
FIG. 14 is a fragmentary front elevation of an anchor mounting device according to the third embodiment of this invention.

Now, description will be made on the third embodiment of this invention in which the base is provided with first and second interlocking means. FIG. 14 is a fragmentary front elevation of the anchor mounting device according to the third embodiment of this invention. In the third embodiment, a plurality of teeth 73,73, . . . which constitute the first interlocking means are formed in bent portions 72,72 of a base 71 and a plurality of openings 75,75, . . . which make up the second interlocking means are formed through side plates 74,74 of the base 71. This anchor mounting device may be used in the same manner as that according to the first embodiment. One part of the load applied to the anchor plate is transmitted to the latch pieces 64,65 via the pin 37 and is born by the teeth 73,73 and openings 75,75, which teeth and openings are both in engagement with their corresponding interlocking legs 66,67. The other part of the load is transmitted first to the slide member 14 via the pin 37 and is then born by the teeth 73,73 and openings 75,75 via the opening 27 of the slide member 14, which teeth and openings are both in engagement with their corresponding interlocking legs 66,67 of the latch pieces 64,65. As mentioned above, the load transmitted to the interlocking legs 66,67 are born by two different interlocking means, which are the teeth 73,73 and openings 75,75, in the present embodiment, whereby assuring more sucured locking of the anchor plate.

Figure 15:
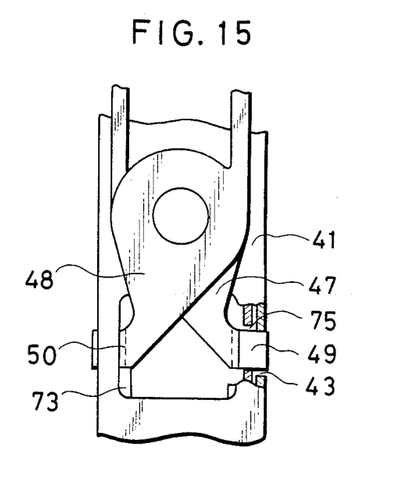
FIG. 15 is a fragmentary front elevation of a modification of the anchor mounting device according to the third embodiment.

Similar to the first embodiment, modifications may also be contemplated to the third embodiment. The slide member 14 and latch pieces 64,65 may be modified as shown respectively in FIGS. 8 and 9. This modified embodiment is different from the third embodiment only in that, as shown in FIG. 15, one part of the load applied to the anchor plate is transmitted to the latch pieces 47,48 via the windows 43 of the slide member 41.

Figure 16:
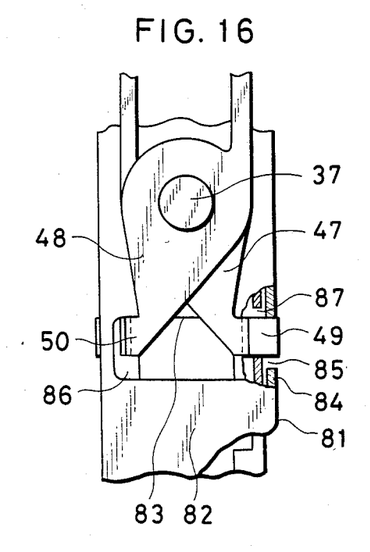
FIG. 16 is a fragmentary front elevation of an anchor mounting device according to the fourth embodiment of this invention.

Now, the fourth embodiment of this invention will be described, in which a first and second interlocking portions are provided with the slide member. FIG. 16 is a fragmentary front elevation of the fourth embodiment. It is different from the modified embodiment of the third embodiment in that an opening 83 which is engageable as the first interlocking portion with the latch pieces 47,48 is formed through an upper plate 82 of a slide member 81. Accordingly, windows 85 formed through side plates 84,84 serve as the second interlocking portion. The anchor mounting device according to the fourth embodiment may be used in the same manner as the first embodiment. However, one part of the load applied to the anchor plate is transmitted to the latch pieces 47,48 via the pin 37 and then born by teeth 87 and openings 87,87, which teeth and openings are in engagement with their corresponding interlocking legs 49,50. The other part of the load is transmitted to the slide member 81 via the pin and is then born by the teeth 86,86 and openings 87,87 via an opening 83 and windows 83,83 of the slide member, which teeth and openings are in engagement with their corresponding interlocking legs 49,50. In the present embodiment, the transmission of the load from the slide member 81 to the latch pieces 47,48 has been rendered surer.

Figure 17:
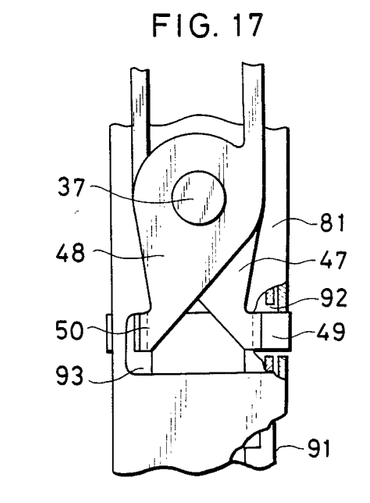
FIGS. 17 and 18 are fragmentary front elevations showing respectively modifications of the anchor mounting device according to the fourth embodiment.
Figure 18:
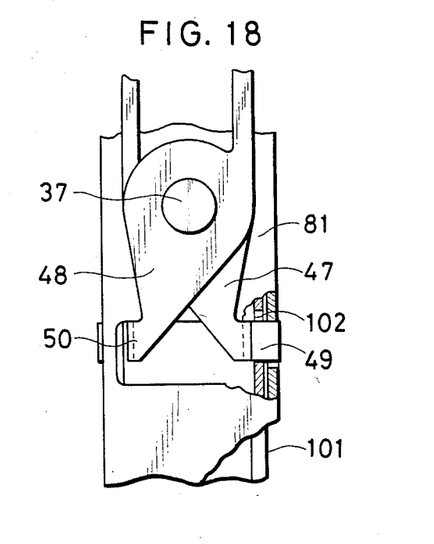

Further modifitions may also be contemplated to the anchor mounting device according to the fourth embodiment, including:

(1) an anchor mounting device in which the openings formed through a base 91 are used merely as guide openings 92 and the interlocking legs 49,50 of the latch pieces 47,48 are supported only by teeth 93,93 of the base 91 (see, FIG. 17); and (2) an anchor mounting device in which no teeth are provided with a base 101 and the interlocking legs 49,50 of the latch pieces 47,48 are supported by openings 102,102 of the base 101 (see, FIG. 18).

In each of the above modifications, the transmission of the load from the slide member to the latch pieces takes place in the same manner as in the fourth embodiment. These modified embodiments can also bring about the same effects as the fourth embodiment.

In each of the above-described embodiments and their modifications, the load is transmitted through two separate route. A further modification may also be contemplated to avoid transmission of a load from the pin to the base via the latch pieces by, for example, bonding the pin and latch pieces with a resin or forming the pin holes of the latch pieces into slots. In such a modified embodiment, each load is transmitted from the pin to the interlocking legs of the latch pieces via the slide member and is then born by the interlocking portions of the base, which portions are in engagement with the interlocking legs. Thus, the compression stress or shearing stress is centered at the interlocking legs. An anchor mounting device according to such a modified embodiment can still withstand heavy loads if the strength of the interlocking legs is enhanced.

Figure 19:
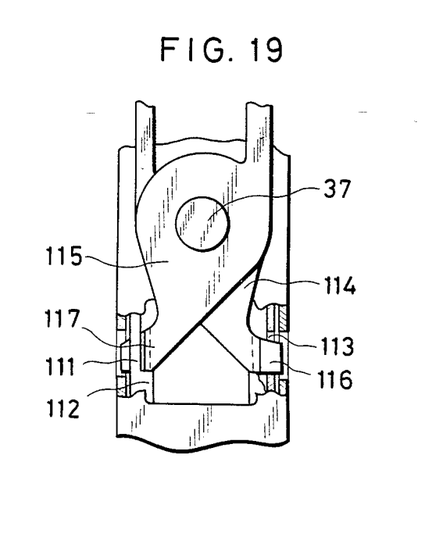
FIG. 19 is a fragmentary front elevation of an anchor mounting device according to the fifth embodiment of this invention.

Referring next to FIG. 19, the fifth embodiment of this invention will be described. In the present embodiment, a base 11 is provided with teeth 112 and openings 113 which serve as the first and second interlocking means respectively. The anchor mounting device according to the fifth embodiment may be used in the same manner as that according to the first embodiment. The load applied to the anchor plate is transmitted to latch pieces 114,115 via the pin and is then born by the teeth 112,112 and openings 113,113 which are both in engagement with their corresponding latch pieces 114,115.

In the above embodiments and their modifications, the positions and shapes of the interlocking portions provided with the base have been illustrated merely by way of example and can, needless to say, be subjected to further designing modifications as needed (e.g., the openings 63 may be formed into circular holes).

The anchor plate and latch pieces are attached to the slide member by the same pin. They may be attached to the slide member by means of separate pins.

Figure 20:
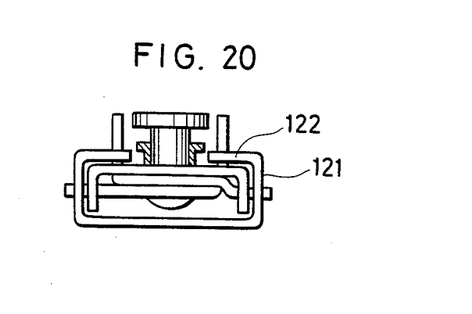
FIG. 20 is a schematic illustration of another modification of the anchor mounting device according to this invention.

It is possible to form the slide member and base as shown in FIG. 20, in other words, in such a way that a slide member 121 is enclosed within a base 122.

As apparent from FIG. 2 and other drawings, parts of the latch pieces project outwardly from the slide member. It is however possible to form either one or both of the latch pieces in such a way that they are concealed behind the slide member except for their finger rests. This structure improves the appearance of the anchor mounting device still further when seen from the inside of the vehicle.

The invention has been described on anchor mounting devices, each of which makes use of a pair of latch pieces. They may however be replaced by a single latch piece without encountering any substantial problems or inconvenience.

Furthermore, the base is formed in a substantially C-shape in cross-section in each of the above embodiments. Needless to say, the shape of the base is not necessarily limited to such configurations and it may be formed into any suitable shape so long as it permits free sliding movements of the slide member.

Having now fully described the invention, it will be apparent to one of ordinary skill in the art that many changes and modifications can be made thereto without departing from the spirit or scope of the invention as set forth herein.

What is claimed is:

1. An anchor mounting device for a vehicle body, comprising:
   an anchor plate which is displaceable in a direction of displacement;
   a base adapted to be mounted on a vehicle body and having interlocking means which is formed of a plurality of interlocking portions provided along the direction of displacement of the anchor plate;
   a slide member guided along the base and carrying the anchor plate thereon;
   at least one latch piece supported pivotally on the slide member and displaceable between a first position where the latch piece is in engagement with the interlocking means and a second position where the latch piece is out of engagement with the interlocking means;
   means kept in engagement with the latch piece to normally bias the latch piece toward the first position; and
   an additional interlocking portion provided on the slide member and engagable with the latch piece only at the first position, and when a load has been applied to the anchor plate, capable of transmitting the load from the slide member to the interlocking means by way of the latch piece.

2. An anchor mounting device according to claim 1, including a mounting member, the latch piece being attached together with the anchor plate to the slide member by means of the mounting member.

3. An anchor mounting device for a vehicle body comprising:
   an anchor plate which is displaceable in a direction of displacement;
   a base adapted to be mounted on a vehicle body and having a parallel pair of interlocking means which are each formed of a plurality of interlocking portions provided along the direction of displacement of the anchor plate;
   a slide member guided along the base and carrying the anchor plate thereon;
   a pair of latch pieces mounted on the slide member and displaceable between first positions where the latch pieces are in engagement with their corresponding interlocking means and second positions where the latch pieces are out of engagement with their corresponding interlocking means; and
   means normally biasing the latch pieces toward their respective first positions;
   additional interlocking portions provided on the slide member and engagable with the latch pieces only at the first position, and when a load has been applied to the anchor plate, capable of transmitting the load from the slide member to the interlocking means by way of the latch pieces.

4. An anchor mounting device for a vehicle body comprising:
   an anchor plate which is displaceable in a direction of displacement;
   a base adapted to be mounted on a vehicle body and having interlocking means which is formed of a plurality of interlocking portions provided along the direction of displacement of the anchor plate;
   a slide member guided along the base and carrying the anchor plate thereon;
   at least one latch piece displaceable between a first position where the latch piece is in engagement with the interlocking means and a second position where the latch piece is out of engagement with the interlocking means;

means normally biasing the latch piece toward the first position;

an additional interlocking portion provided on the slide member and engagable with the latch piece only at the first position, and when a load has been applied to the anchor plate, capable of transmitting the load from the slide member to the interlocking means by way of the latch piece; and means for mounting the latch piece on the slide member in such a way that when the load is transmitted to the latch piece, the latch piece is movable relative to the slide member at the point of mounting.

5. An anchor mounting device for a vehicle body, comprising:

an anchor plate which is displaceable in a direction of displacement;

a base adapted to be mounted on a vehicle body and having interlocking means which is formed of a plurality of interlocking portions provided along the direction of displacement of the anchor plate;

a slide member guided along the base and carrying the anchor plate thereon;

at least one latch piece displaceable between a first position where the latch piece is in engagement with the interlocking means and a second position where the latch piece is out of engagement with the interlocking means;

means normally biasing the latch piece toward the first position;

an additional interlocking portion provided on the slide member and normally kept out of engagement with the latch piece, and when a load has been applied to the anchor plate and the latch piece has undergone deformation at the first position, brought into engagement with the latch piece so as to transmit the load from the slide member to the interlocking means by way of the latch piece.

6. The anchor mounting device according to claim 1, wherein the base is provided with further interlocking means and the anchor mounting device includes at least one latch piece which is engageable with both of the interlocking means.

7. The anchor mounting device according to claim 1, wherein the slide member is provided with a further interlocking portion and the anchor mounting device includes at least one latch piece which is engageable with both of the interlocking portions.

8. The anchor mounting device according to claim 6, wherein the slide member is provided with a further interlocking portion and the latch piece is also engageable with both of the interlocking portions.

9. The anchor mounting device according to claim 1, wherein the base is formed into a substantially C-shape in cross-section and the slide member is provided outside the base.

10. The anchor mounting device according to claim 1, wherein the base is formed into a substantially C-shape in cross-section and the slide member is provided inside the base.

* * * * *